United States Patent
Deaton et al.

(10) Patent No.: US 11,580,284 B1
(45) Date of Patent: Feb. 14, 2023

(54) SYSTEM, METHOD, AND COMPUTER PROGRAM PRODUCT FOR FINDING AND ANALYZING DEADLOCK CONDITIONS ASSOCIATED WITH THE FORMAL VERIFICATION OF AN ELECTRONIC CIRCUIT DESIGN

(71) Applicant: Cadence Design Systems, Inc., San Jose, CA (US)

(72) Inventors: Craig Franklin Deaton, Rowlett, TX (US); Christopher William Komar, Phoenix, AZ (US); Lars Lundgren, Molnlycke (SE)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/142,360

(22) Filed: Jan. 6, 2021

(51) Int. Cl.
  *G06F 30/30* (2020.01)
  *G06F 30/33* (2020.01)
  *G06F 30/31* (2020.01)
  *G06F 111/04* (2020.01)
  *G06Q 10/10* (2012.01)

(52) U.S. Cl.
  CPC ............. *G06F 30/33* (2020.01); *G06F 30/31* (2020.01); *G06F 2111/04* (2020.01); *G06Q 10/101* (2013.01)

(58) Field of Classification Search
  CPC ...... G06F 30/33; G06F 30/31; G06F 2111/04; G06Q 10/101
  USPC ........................................................ 716/102
  See application file for complete search history.

(56) References Cited

U.S. PATENT DOCUMENTS

| | | | |
|---|---|---|---|
| 8,381,148 B1 * | 2/2013 | Loh | G06F 30/327 716/106 |
| 8,943,465 B2 * | 1/2015 | Broadfoot | G06F 8/20 717/104 |
| 10,007,746 B1 * | 6/2018 | Wolfovitz | G06F 30/3323 |
| 2009/0307660 A1 * | 12/2009 | Srinivasan | G06F 8/314 717/114 |

OTHER PUBLICATIONS

Eslinger et al., "Deadlock Verification For Dummies—The Easy Way Using SVA and Formal", DVCon US 2020—Global Semiconductor IP Business Development, Mar. 3, 2020-Mar. 4, 2020 (Year: 2020).*
Author Unknown, "Lecture 7: Computation Tree Logics," Downloaded Jan. 6, 2021, http://www.cs.cmu.edu/~emc/15414-f11/lecture/lec11_TempLogic.pdf., pp. 1-14.

* cited by examiner

*Primary Examiner* — Jack Chiang
*Assistant Examiner* — Brandon Bowers
(74) *Attorney, Agent, or Firm* — Mark H. Whittenberger; Holland & Knight LLP

(57) ABSTRACT

The present disclosure relates to a method for electronic circuit design. Embodiments may include receiving, using a processor, an electronic circuit design and performing a deadlock check on the electronic circuit design using a using a linear temporal logic property and a proof engine. Embodiments may further include analyzing a counterexample associated with the electronic circuit design for a loop escape condition, wherein analyzing includes proving a cover trace of a liveness obligation. If the loop escape condition is reachable from the counterexample, embodiments may include extracting one or more events associated with the loop escape condition and adding a waiver constraint to the deadlock check to force a no deadlock outcome.

20 Claims, 9 Drawing Sheets

SYSTEM, METHOD, AND COMPUTER PROGRAM PRODUCT FOR FINDING AND ANALYZING DEADLOCK CONDITIONS ASSOCIATED WITH THE FORMAL VERIFICATION OF AN ELECTRONIC CIRCUIT DESIGN

FIELD OF THE INVENTION

The present disclosure relates to electronic design verification, and more specifically, to a method for analyzing deadlock conditions associated with formal verification.

DISCUSSION OF THE RELATED ART

Formal verification of an electronic design relies upon a system of constraints to communicate the legal state space to the proof engines. A common problem in the verification of digital designs is detecting deadlock conditions and/or proving their absence. Currently available solutions either are unable to differentiate between true deadlocks (where the design is actually hung) and potential deadlocks (where some missing stimulus might enable progress to resume), or are heavily capacity limited and only run on extremely small designs.

SUMMARY OF DISCLOSURE

In one or more embodiments of the present disclosure, a computer-implemented method for electronic circuit design is provided. The method may include receiving, using a processor, an electronic circuit design and performing a deadlock check on the electronic circuit design using a linear temporal logic property and a proof engine. The method may further include analyzing a counterexample associated with the electronic circuit design for a loop escape condition, wherein analyzing includes proving a cover trace of a liveness obligation. If the loop escape condition is reachable from the counterexample, the method may include extracting one or more events associated with the loop escape and adding a waiver constraint to the deadlock check to force a no deadlock outcome.

One or more of the following features may be included. Extracting one or more events may include extracting one or more events that enable the loop escape from the cover trace. Extracting one or more events may include extracting one or more events that characterizes a loop portion of the cover trace. The method may further include adding a constraint that forces the waiver constraint to be asserted and preventing a subsequent analysis of the counterexample. The method may include iteratively repeating the performing, analyzing, extracting, and adding until either no counter example is found or the loop escape is unreachable. The method may include displaying, at a graphical user interface, one or more escape mechanisms for user review.

In one or more embodiments of the present disclosure, a computer-readable storage medium for use in an electronic design is provided. The computer-readable storage medium may include instructions that when executed by a machine result in one or more operations. Some operations may include receiving, using a processor, an electronic circuit design and performing a deadlock check on the electronic circuit design using a linear temporal logic proof engine. Operations may further include analyzing a counterexample associated with the electronic circuit design for a loop escape condition, wherein analyzing includes proving a cover trace of a liveness obligation. If the loop escape condition is reachable from the counterexample, operations may include extracting one or more events associated with the loop escape, wherein extracting one or more events includes extracting one or more events that enable the loop escape from the cover trace and extracting one or more events that characterizes a loop portion of the cover trace. Operations may also include adding a waiver constraint to the deadlock check to force a no deadlock outcome and adding a constraint that forces the waiver constraint to be asserted. Operations may include iteratively repeating the performing, analyzing, extracting, adding a waiver constraint, and adding a constraint that forces the waiver constraint to be asserted until either no counter example is found or the loop escape is unreachable.

One or more of the following features may be included. Extracting one or more events may include storing the one or more events. Adding a waiver constraint may include adding a waiver constraint to the deadlock check to force a no deadlock outcome on a given clock cycle. Operations may include displaying, at a graphical user interface, one or more escape mechanisms for user review if a soft reset or manual override is present. In some embodiments, the deadlock check may determine whether a valid input sequence exists to move beyond a current design state.

In one or more embodiments of the present disclosure, a system is provided. The system may include a computing device having at least one processor configured to receive an electronic circuit design and to perform a deadlock check on the electronic circuit design using a proof engine. The at least one processor may be further configured to analyze a counterexample associated with the electronic circuit design for a loop escape condition, wherein analyzing includes proving a cover trace. If the loop escape condition is reachable from the counterexample, extracting one or more events associated with the loop escape condition, the at least one processor may be further configured to extract one or more events associated with the loop escape and to add a waiver constraint to the deadlock check to force a no deadlock outcome.

One or more of the following features may be included. Extracting one or more events may include extracting one or more events that enable the loop escape from the cover trace. Extracting one or more events may include extracting one or more events that characterizes a loop portion of the cover trace. The at least one processor may be configured to add a constraint that forces the waiver constraint to be asserted. The at least one processor may be configured to prevent a subsequent analysis of the counterexample. The at least one processor may iteratively repeat the performing, analyzing, extracting, and adding until either no counter example is found or the loop escape is unreachable. The at least one processor may be configured to display, at a graphical user interface, one or more escape mechanisms for user review. The proof engine may be a linear temporal logic proof engine.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
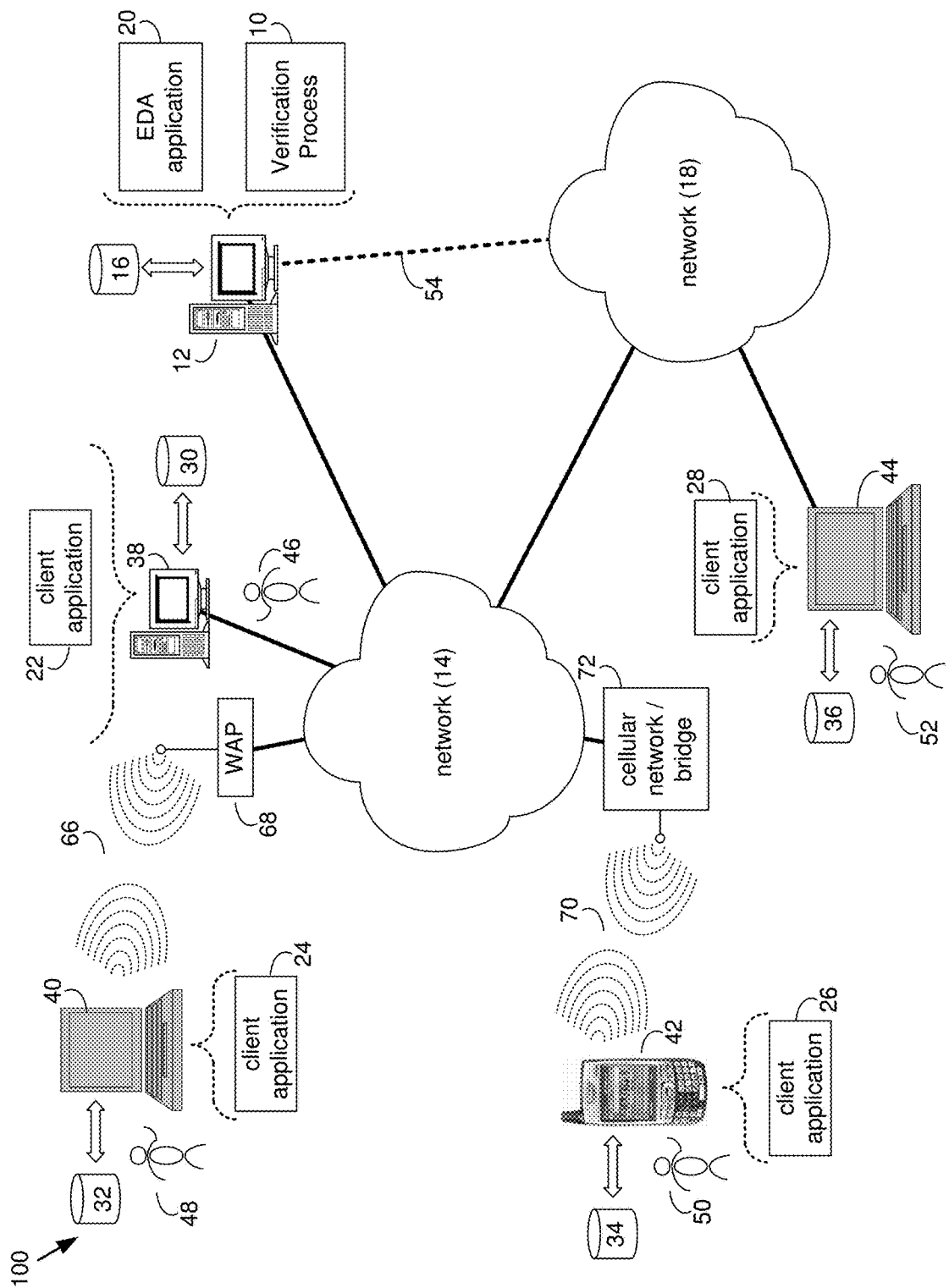
FIG. 1 is a diagram depicting an embodiment of a system in accordance with the present disclosure.

Embodiments included herein describe a method for finding and analyzing deadlock conditions in digital logic designs using formal verification. As discussed above, a common problem in the verification of digital designs is detecting deadlock conditions and/or proving their absence. Currently available solutions either are unable to differentiate between true deadlocks (where the design is actually hung) and potential deadlocks (where some missing stimulus might enable progress to resume), or are heavily capacity limited and only run on extremely small designs. The term "deadlock", as used herein, may relate to a situation where there exists no valid input sequence to move beyond the current design state. A "deadlock free" situation may refer to a situation where there exists at least one valid input sequence to move beyond the current design state. These may be analyzed in model checking using two different computational models, namely a Linear Temporal Logic (LTL) model and a Computational Tree Logic (CTL) model. A CTL Property of the type "AG EF" may indicate that on all paths (A) always (G) there exists path (E) that eventually (F) satisfies the liveness obligation.

Embodiments of the present disclosure resolve these issues by running high-capacity formal proof engines iteratively, with a test for true deadlocks and a waiver constraint to rule out potential, but false, deadlocks between each iteration.

There are two current conventional approaches to this problem. The first is to use a "liveness to safety" transform to enable a normal, high-capacity, Linear Time Logic (LTL) formal proof engine to search for deadlock conditions. Proving liveness assertions requires searching for counter-examples of infinite length. This is because liveness assertions check that something will eventually happen (no matter how far in the future), so it is necessary to explore the infinite future to demonstrate a violation (e.g., that at no point does the required thing ever occur). In contrast, proving safety assertions only requires looking for counter-examples of finite length. This is because safety assertions check that something will never happen, so any trace that shows it happening is sufficient to demonstrate a violation. Finite traces are easier to search for than infinite traces, so it is worthwhile to look for a way to express liveness intent in a safety form.

The problem with liveness to safety approaches is that this search finds potential deadlocks, that may be resolveable via some missing stimulus (typically provided via fairness constraints). A fairness constraint may refer to the "assume" form of a liveness assertion's "assert". For example, a liveness assertion might say: "assert {request|→s_eventually grant}", meaning "attempt to prove that a request will always eventually be followed by a grant". A fairness constraint might say "assume {request|→s_eventually enable}", meaning "do not return any counter-example where enable is not asserted at some point after request". Because of how the liveness-to-safety transform works, counter-examples to the transformed liveness assertions often show situations where the liveness obligation ("grant", in this example) could come, but does not come because of some missing stimulus. Fairness constraints are the tool used to force the missing stimulus to occur.

Often, with the LTL approach, users simply abandon the effort rather than invest the time and energy needed to identify and provide the missing stimulus. An LTL approach may be represented using SystemVerilog assertions and may include an extensive supporting engine technology. Some supporting engines may include, but are not limited to, Binary Decision Diagrams (BDDs), temporal induction, interpolant, IC3, etc. Some or all of these may be used in combination with different types of automated abstractions, some of which may include, but are not limited to, counter-example guided abstraction refinement (CEGAR), proof-based abstraction (PBA), etc. Modifications of the above, with different settings on various configuration parameters may also be used. Portfolio engines, consisting of combinations of the above, potentially cooperating via shared intermediate analysis results may be used as well. Path exploration may be guided by the user and may present false deadlocks to the user.

Another approach is to use special proof engines constructed specially for this purpose, known as Computational Tree Logic ("CTL") engines. These engines do return true deadlocks if any exist, but are also hugely resource constrained. CTL engines may be implemented using Binary Decision Diagrams, and may often be applicable to designs with 500 flops or less. Also, CTL proofs are suspect, in that they may be relying on a sideband mechanism, such as a software reset or manual override, to make progress. This is generally not the user's intention, but may go undetected as the CTL engines do not have a way to report on the relevant deadlock escape mechanisms. Embodiments included herein may leverage the scalability of LTL engines, but overcome the LTL shortcomings in an automated way, to achieve better CTL-like results on larger designs. Additional information regarding CTL approaches may be found in http://www.cs.cmu.edu/~emc/15414-f11/lecture/lec11_TempLogic.pdf. An example CTL engine may use a Binary Decision Diagram to enumerate all states from which the liveness obligation is eventually satisfiable, and then to look for reachable states that fall outside that set.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Referring to FIG. 1, there is shown a verification process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, verification process 10 may reside on and be executed, in whole or in part, by a client electronic device, such as a personal computer, notebook computer, personal digital assistant, or the like.

The instruction sets and subroutines of verification process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization and/or verification.

Verification process 10 may be a stand alone application, or may be an applet/application/script that may interact with and/or be executed within EDA application 20. In addition/as an alternative to being a server-side process, verification process 10 may be a client-side process (not shown) that may reside on a client electronic device (described below) and may interact with an EDA client application (e.g., one or more of EDA client applications 22, 24, 26, 28). Further, verification process 10 may be a hybrid server-side/client-side process that may interact with EDA application 20 and an EDA client application (e.g., one or more of client applications 22, 24, 26, 28). As such, verification process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize verification process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

Figure 2:
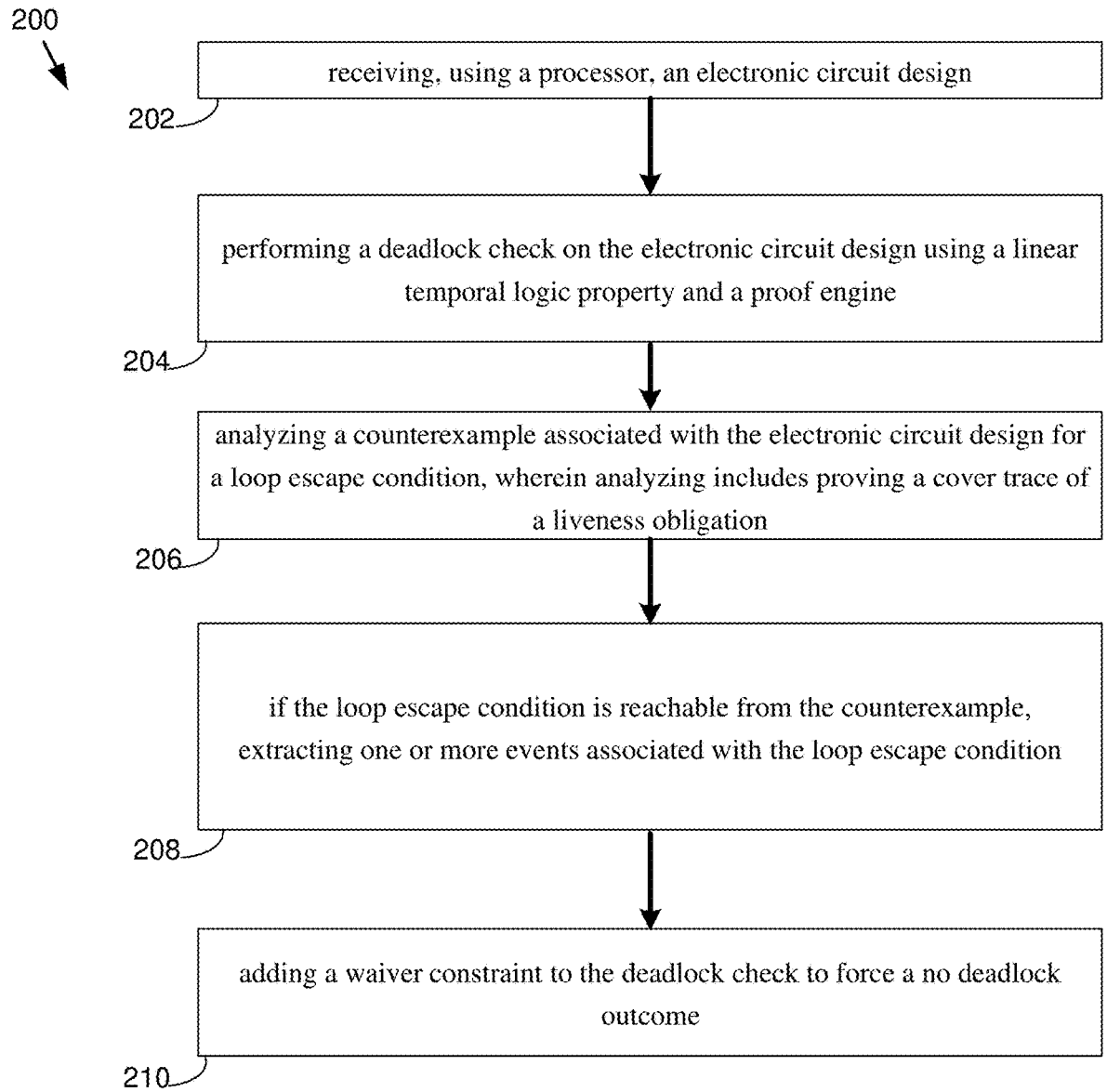
FIG. 2 is a flowchart depicting operations consistent with the verification process in accordance with an embodiment of the present disclosure.
Figure 3:
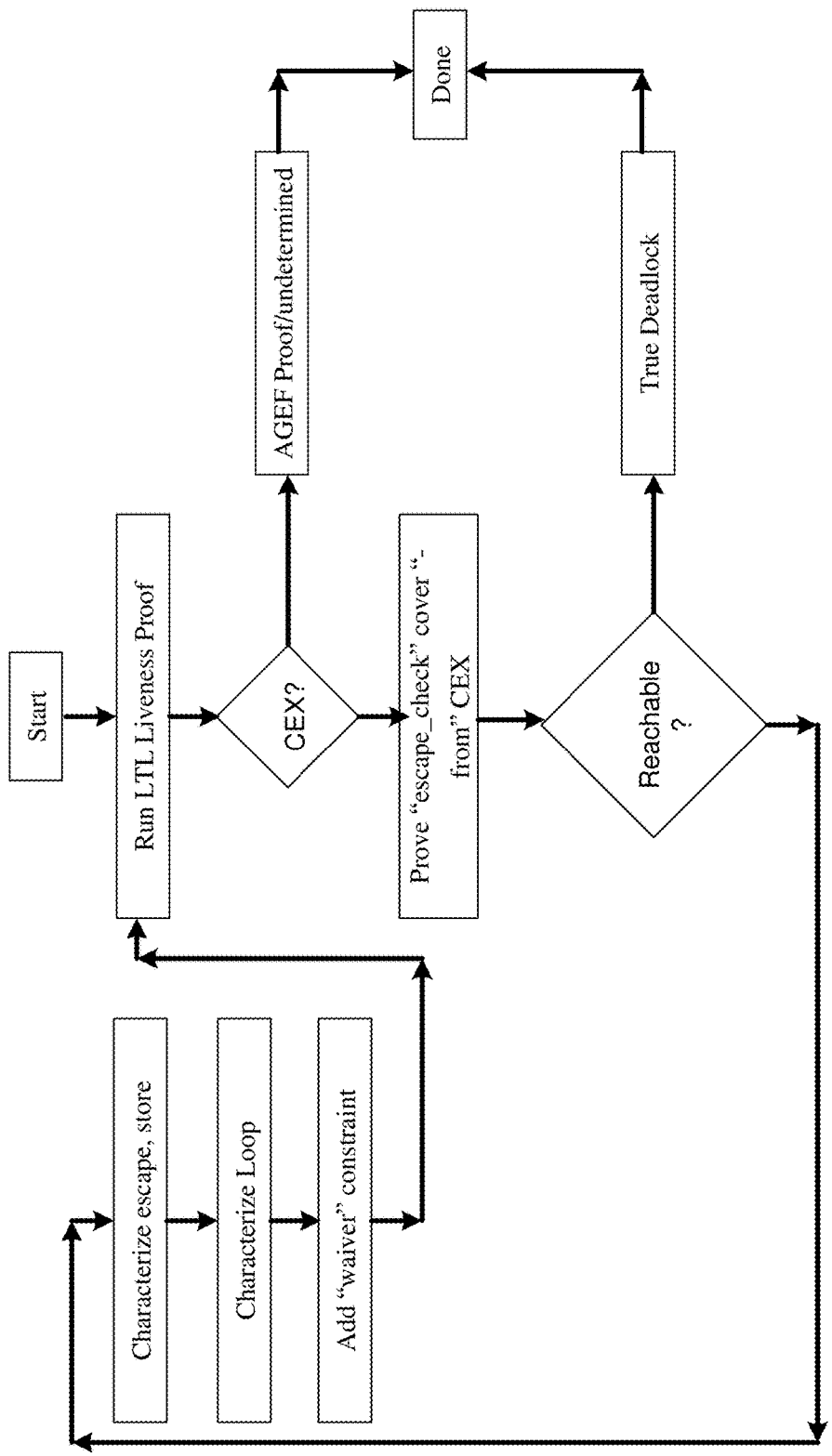
FIG. 3 is a flowchart depicting operations consistent with the verification process in accordance with an embodiment of the present disclosure.

Referring now to FIGS. 2-3, exemplary flowcharts 200 and 300 depicting operations consistent with verification process 10 is provided. Embodiments may include receiving (202), using a processor, an electronic circuit design and performing (204) a deadlock check on the electronic circuit design using a linear temporal logic proof engine. Operations may further include analyzing (206) a counterexample associated with the electronic circuit design for a loop escape condition, wherein analyzing includes proving a cover trace of a liveness obligation. If the loop escape condition is reachable from the counterexample, operations may include extracting (208) one or more events associated with the loop escape condition. Operations may also include adding (210) a waiver constraint to the deadlock check to force a no deadlock outcome Numerous other operations are also within the scope of the present disclosure.

As used herein, an "event" occurs in a circuit when the value of one signal determines the value of another. For example, this could be when a flip-flop receives a clock edge and captures the value of its D pin onto its Q pin (whether the Q pin changes values as a result or not), or could be the inputs to a boolean function forcing its output to have some value. The idea is to analyze which signals having which values at which times led to the specified outcome.

In some embodiments, a proof attempt may correspond to a search for counterexamples that violate the property in question. With that in mind, a good first step in understanding what a given proof means is to look at the structure of a counterexample.

For liveness assertions of the form:
a|→s_eventually b

Figure 4:
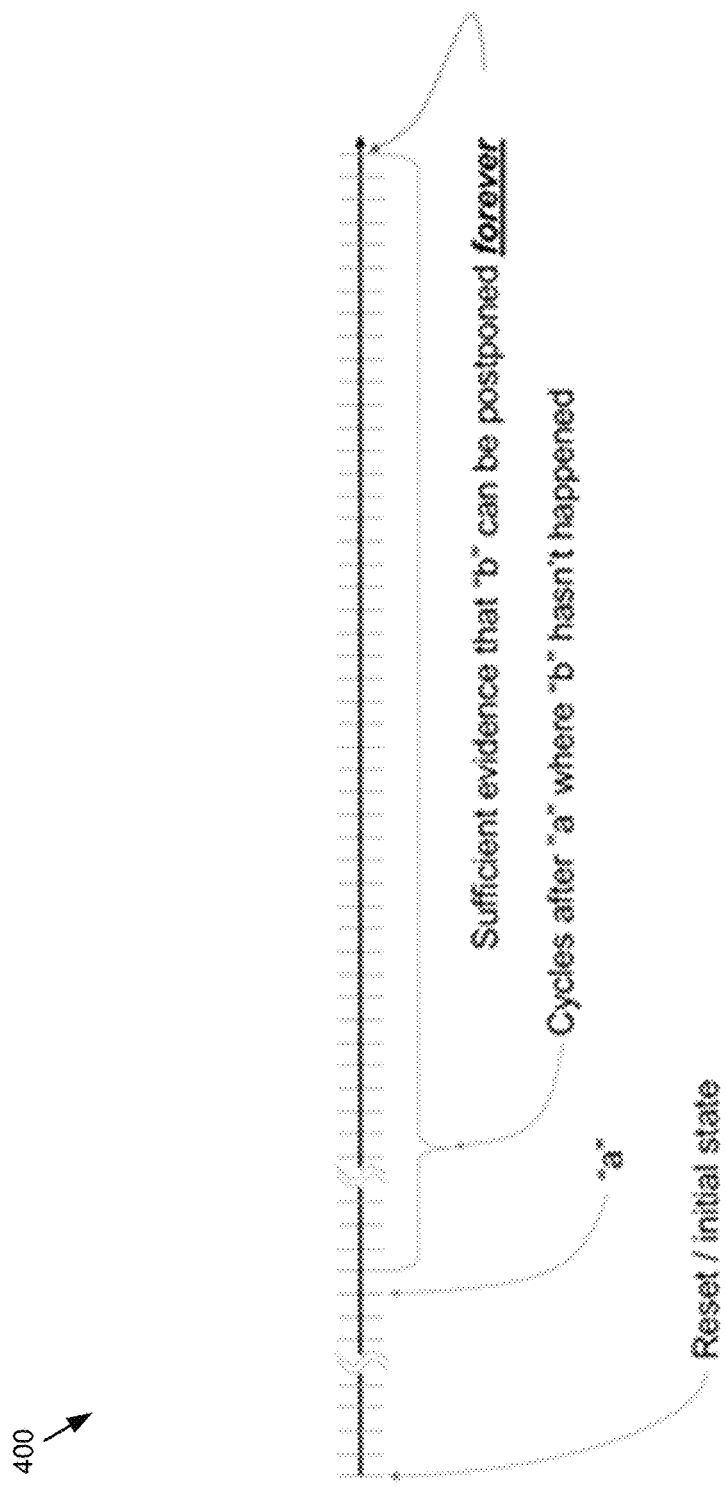
FIG. 4 is a diagram consistent with the verification process in accordance with an embodiment of the present disclosure.
Figure 5:
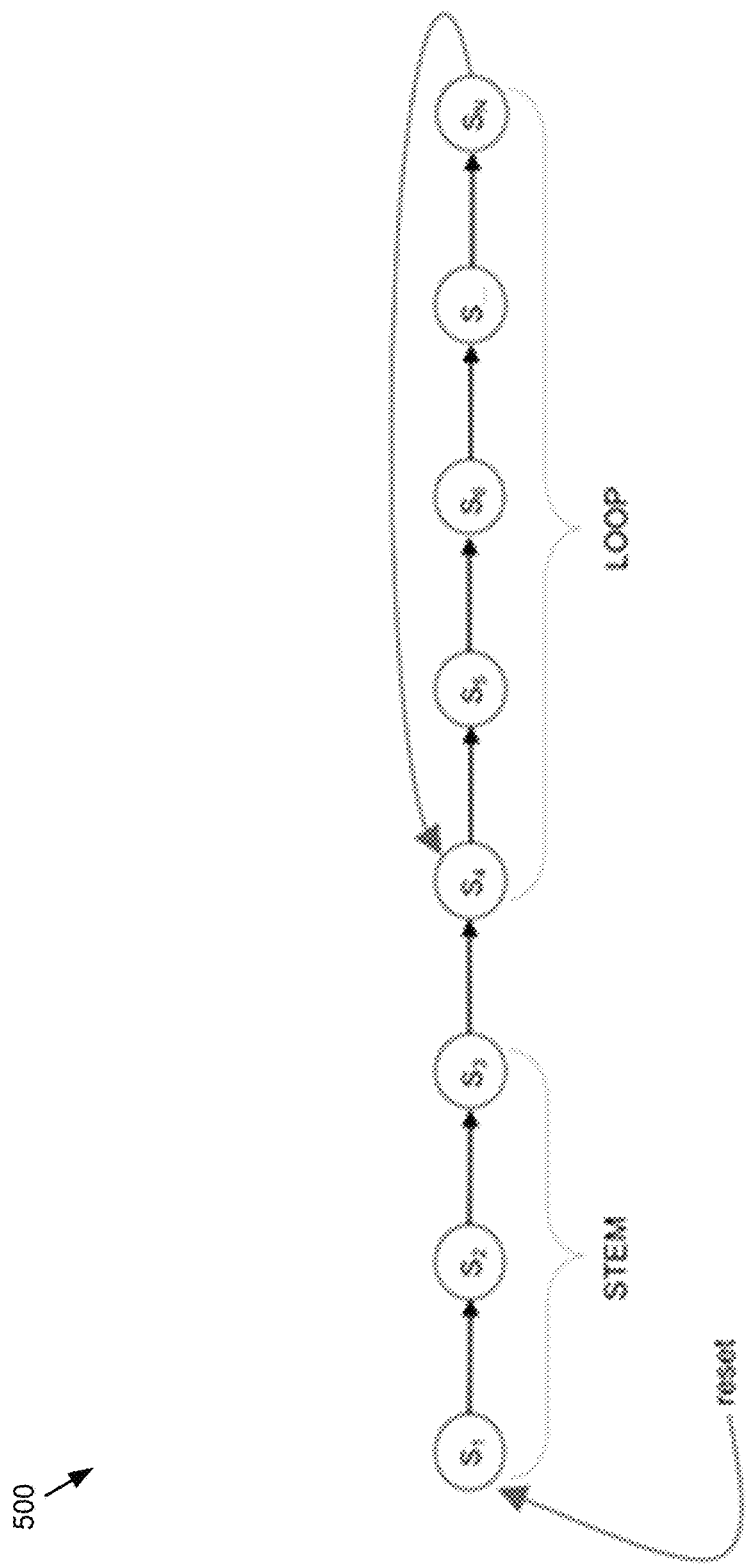
FIG. 5 is a diagram consistent with the verification process in accordance with an embodiment of the present disclosure.
Figure 6:
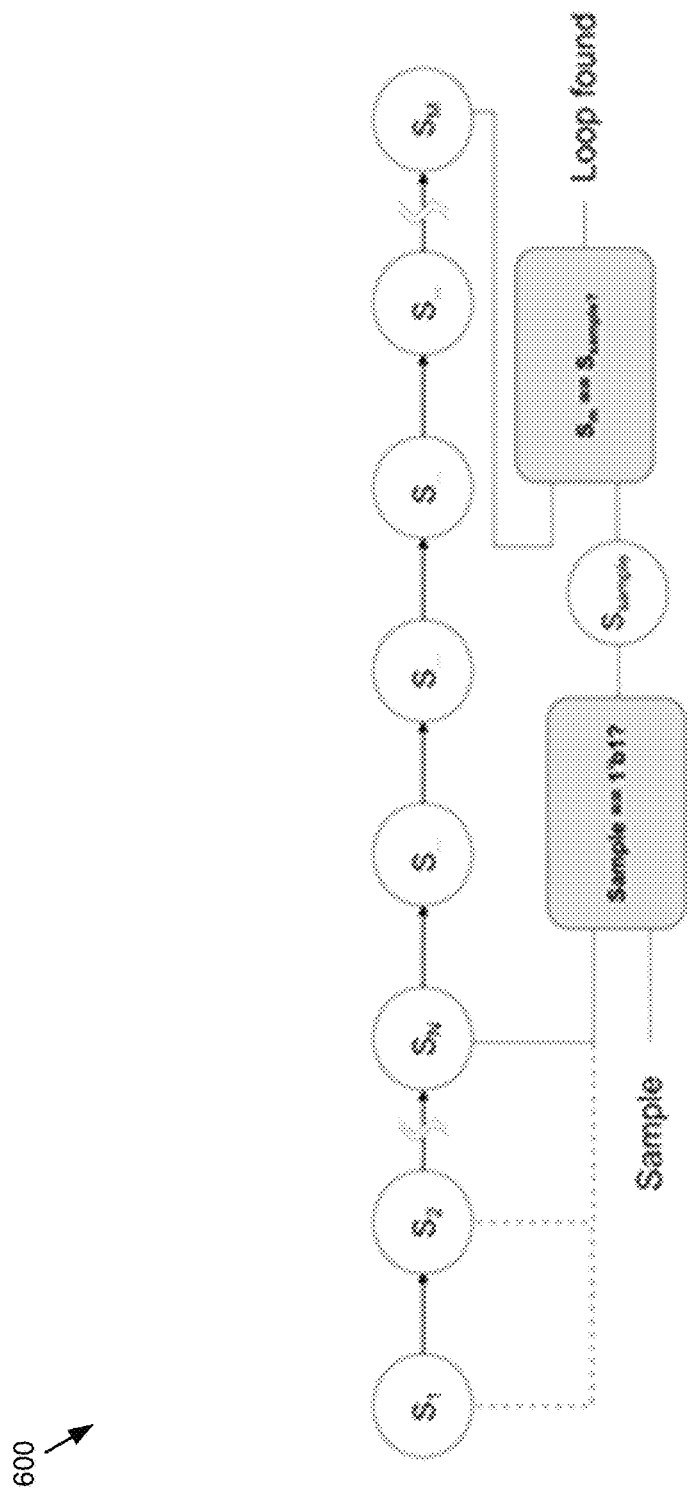
FIG. 6 is a diagram consistent with the verification process in accordance with an embodiment of the present disclosure.

One or more counterexamples may be structured as shown in FIG. 4. In the last cycle, some rationale must be shown that the trace can be extended to infinity without the liveness obligation ("b", in this case) ever being satisfied. The way proof engines perform this is may involve looking for a "state loop." To find a "looping" counterexample, proof engines look for a way to get the design into a given state (S4, in FIG. 5) and return the design to that state without ever satisfying the liveness obligation. A counterexample trace of this form can be thought of as having two sections: a "stem" followed by a "loop": as shown in FIG. 5. One way that engines implement this search is by non-deterministically sampling the state of the design, and then searching for a way to return the design to the sampled state as shown in FIG. 6. If a trace is found where this can be performed without satisfying the liveness obligation in the loop, then this trace constitutes a liveness counterexample.

LTL liveness proofs often return counterexamples that may not be true deadlocks and, as such, may not be what the user desires. Finding true deadlocks via an LTL approach usually requires fairness constraints and is not intuitive for the user. CTL "AG EF" counterexamples are true deadlocks, but many CTL engines are based on a binary decision diagram (BDD) approach. This approach is very resource constrained.

There are numerous examples that may benefit from CTL "AG EF" proofs. Some of these may include, but are not limited to, deadlocks/livelocks in an EDA application (e.g., Cadence® JasperGold® Superlint App available from the Assignee of the present disclosure) and/or liveness in EDA application (e.g., Cadence® JasperGold® Formal Property Verification (FPV) available from the Assignee of the present disclosure).

Accordingly, embodiments of verification process 10 may use multiple LTL proofs instead of a single CTL proof. In operation, the process may prove a liveness assertion via LTL. If the assertion is proven and there are no deadlocks, the process may end. In contrast, if a counterexample is obtained the process may test the counterexample for a loop escape. This may involve determining whether the counter-example trace may be extended to satisfy the liveness obligation. If not, the counterexample is a real deadlock and the process may end. If the counterexample trace may be extended to satisfy the liveness obligation then the counterexample is an escapable deadlock. In this case, the "waiver" constraint may be added and the process may again attempt to prove the liveness assertion via LTL.

In some embodiments, a "loop check" may be used to establish that the liveness condition can be postponed forever, but the question remains as to whether some missing constraint (typically specified via a fairness constraint, as mentioned above) could terminate that postponement and cause the liveness obligation to be returned. This is referred to herein as a "loop escape", and the missing stimulus is referred to as the "loop escape condition".

Figure 7:
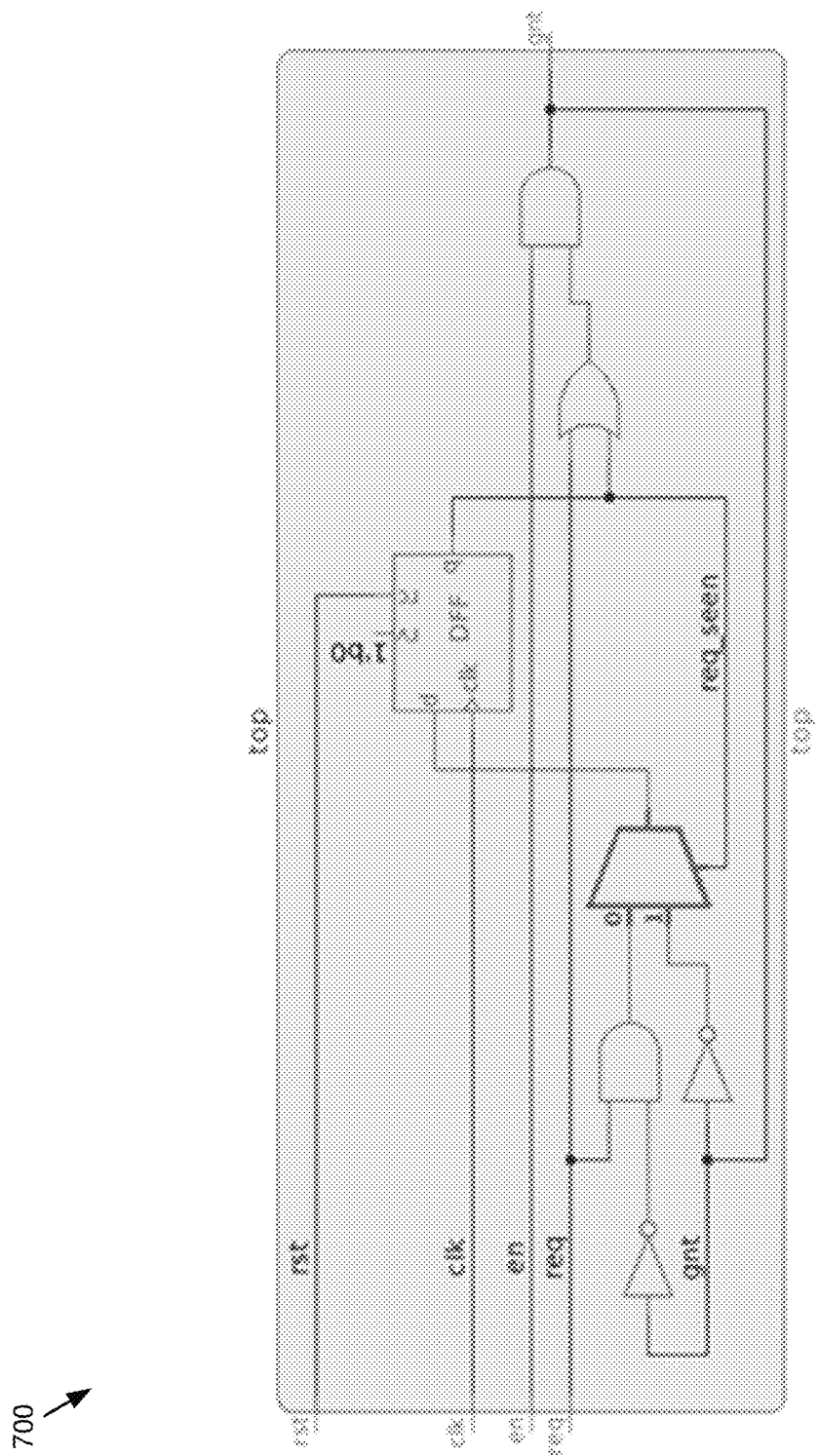
FIG. 7 is a schematic consistent with the verification process in accordance with an embodiment of the present disclosure.

For example, given a circuit that registers when "request" occurs, and then, when "enable" also occurs, returns "grant". The "loop" may consist of "request" followed by "not enable", because the "not enable" cycle can be repeated infinitely, thereby postponing "grant" forever. The "loop escape condition" would be to supply "enable", thereby escaping from the loop and returning "grant". An example schematic showing an REQ→GNT circuit is provided in FIG. 7. This example is not a true deadlock.

Figure 8:
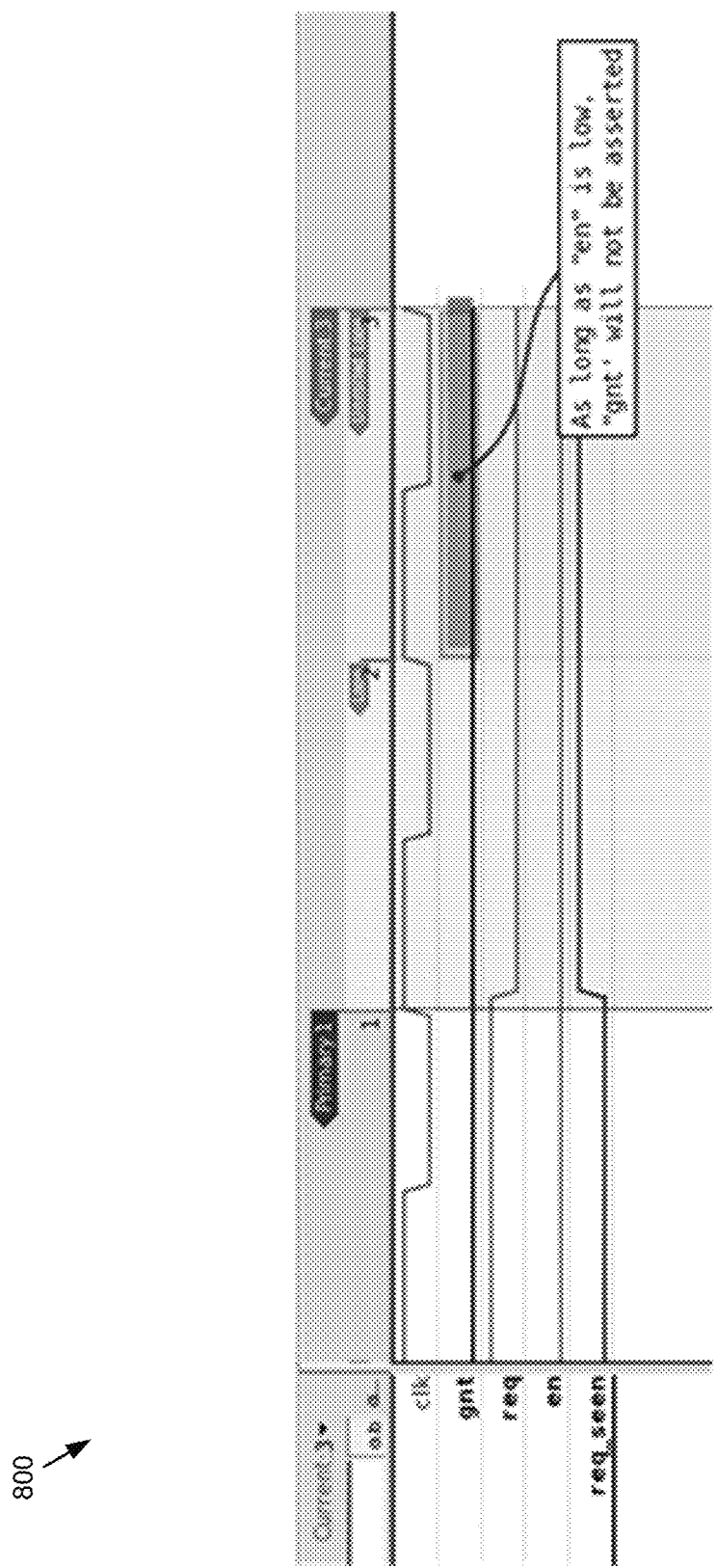
FIGS. 8-9 are waveforms consistent with the verification process in accordance with an embodiment of the present disclosure.
Figure 9:
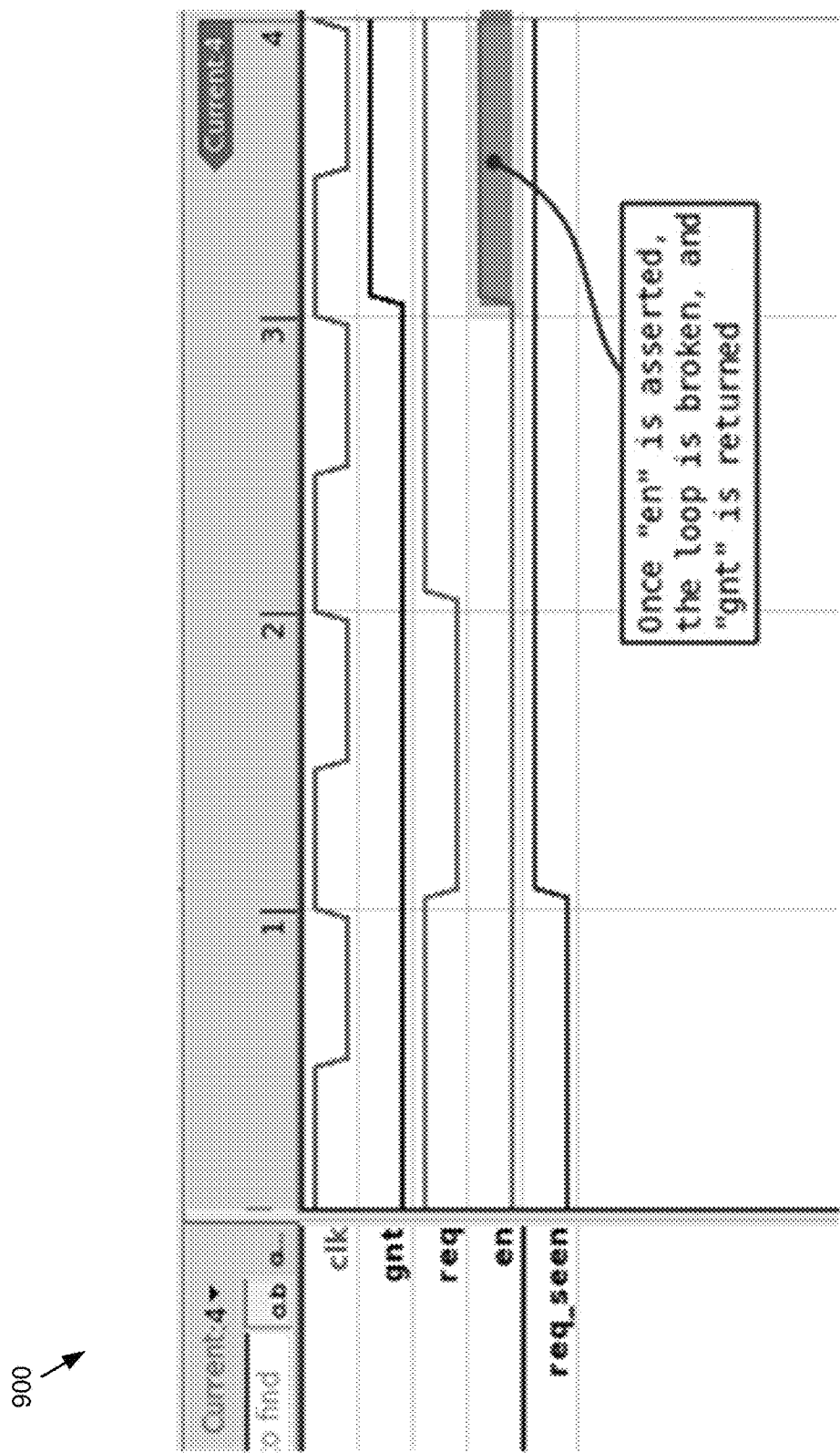

Referring now to FIG. 8, an example waveform 800 showing a stem (white background cycle) and loop (both darker background cycles) where the lack of "en" causes "gnt" to be postponed forever. Given a liveness-to-safety counter-example trace, showing the "loop" where "request" has been asserted and "grant" can be postponed forever, the question becomes whether "grant" is impossible (e.g., deadlock). Or can the loop be escaped with the proper stimulus. One way to test for this is to treat the counter-example trace as the initial condition of a proof of a cover property that tries to assert "grant". If "grant" is not reachable starting from the counter-example trace, then that counter-example shows a true deadlock. If "grant" is reachable from the counter-example trace, then that counter-example is not a true deadlock. An example waveform showing how asserting "en" while "req_seen" is true breaks the loop and causes "gnt" to assert is provided in FIG. 8. Since CTL AG EF proofs only report true deadlocks, it is necessary to differentiate between the two and discard the counter-examples that are not true deadlocks.

An example of a counterexample waiver constraint is provided below. Given the liveness assertion (e.g., assert -name liveness {req|→s_eventually gnt}), the process may add a free "waive" signal to the assertion (e.g., assert -name liveness {req|→s_eventually (gnt|waive)}. It should be noted that this doesn't interfere with proofs. The process may assume that the "waive" signal asserts whenever the specified loop occurs (e.g., assume -name waiver {<loop_expr>|→waive)} unless it is constrained to do so. In other words, the process may not disallow the counterexample, it may instead treat it as legal behavior.

In some embodiments, obtaining the loop expression (e.g., <loop_expr>) may include using a transitive "why" (additional information regarding the 'why' concept may be found in U.S. Pat. No. 7,137,078, which is incorporated herein by reference in its entirety), on the loop portion of the counterexample. Verification process 10 may include obtaining the transitive why, discarding one or more non-loop cycles, obtaining signal values, and/or converting "forward from reset" cycles to "backwards from assertion failure" cycles. It should be noted that using "backwards" construction allows constraint to "float" with trace length. Verification process 10 may capture using conjunction of $past expressions (e.g., $past(<signal>==<value>,<cycle>) && $past( . . . ).

An example of a waiver constraint is provided below:

```
assume -name waiver {$past((req == 1'b1),1)    &&
                     $past((en == 1'b0), 1)    |->waive}
```

In other words, when "$past((req==1'b1), 1) && $past ((en==1'b0),1))" occurs verification process 10 may continue to look for a different counterexample (or proof).

Referring again to FIG. 3, a flowchart depicting operations consistent with verification process 10 is provided. Verification process 10 may include running an LTL liveness proof. This may include using one or more proof engines to identify a "stem and loop" counter-example, as described above. It should be noted that any counter-example found might be a "true deadlock" or might not. At this point of the process it may be unclear. Other possibilities include that the proof might prove (i.e., show that there are no counter-examples), or might not converge, which is discussed in further detail below. If the proof does not produce a counter-example, for whatever reason, this flow is complete. In this way, verification process 10 may have a proof of the absence of counter-examples (if the proof converged), or indicate that the proof did not converge and other techniques will be needed to make progress.

In some embodiments, the process may "Prove 'escape_check' cover '-from' CEX". For example, given a liveness assertion of the form "req implies eventually gnt": a counter-example would show "req" happening followed by "gnt" not happening during the "loop" portion of the trace. The "escape_test" cover would just be "gnt". If the counter-example can be extended to show "gnt" happening, then the loop can be "escaped" and is not a "true deadlock". In some EDA applications, this may be accomplished via the "prove -from" command, which may be used as a placeholder for any equivalent approach that initializes a proof with an existing trace and then attempts to extend that trace to accomplish a new goal. If the counter-example is not a true deadlock, and is thus uninteresting to the user, verification process 10 may ignore it and keep looking. If not, the counter-example trace is a true, CTL-style, deadlock counter-example. No additional fairness constraints will enable the liveness obligation ("gnt", in the example assertion) to be reached in this scenario. Since the process has a trace showing how the loop can be broken to reach the liveness obligation, the process may analyze that trace to see what stimulus was needed in order to break the loop, and under what design state the stimulus was needed. Verification process 10 may store that information for use in creating waiver constraints. It may be that the "needed stimulus" was not intended to be allowed (a soft reset might be a good example) so we should also store this for review and signoff by the user. Similarly to characterizing the "loop escape" trace, verification process 10 may also characterize the loop itself in the counter-example trace, to extract the key circuit events that enable the design to return to the sampled state as discussed above. Once verification process 10 has obtained those, the process may store them for potential use in creating waiver constraints. Verification process 10 may "Add 'waiver' Constraint" to craft a constraint that tells the proof engines "this CEX, and others conforming to the same pattern, are uninteresting". This may be accomplished by modifying the property to include a "waiver" bit. There are multiple ways of performing this, including, but not limited to, simply "OR" the waiver bit with the liveness obligation. For example, original: "req implies eventually gnt", waiver-enabled: "req implies eventually (gnt OR waiver)". Once the liveness assertion is "waiver enabled", the "wavier constraint" takes the form: <CEX characteristic expression> implies <waiver bit>. There are multiple ways to capture the <CEX characteristic expression>, namely, escape trace based, loop based, etc. In an escape trace based approach the conditions under which the loop could be escaped are reached, but the stimulus needed to effect the escape is not present. In a loop based approach the key circuit events that characterize a "known uninteresting" loop are reached. Verification process 10 may then return to "RUN LTL Liveness Proof". In other words, with the new "waiver constraint" verification process 10 may obtain new proof results, for example, a new counter-example, a "true deadlock", another pass through the flow, a proof indicating no deadlocks, and/or non-convergence.

In some embodiments, verification process 10 may include finding an LTL counter-example to the deadlock check. Verification process 10 may further include checking the counter-example trace for a "loop escape" by proving a cover of the liveness obligation, using the counter-example trace as the starting point. If the "loop escape" cover is reachable, verification process 10 may extract the events that enable the loop escape from the cover trace and save for later. Verification process 10 may also extract the events that characterize the loop portion of the counter-example trace. Verification process 10 may add a "waiver" bit to the deadlock check that forces a "no deadlock" outcome on a given clock cycle and/or add a constraint that forces the waiver bit to be asserted when process extracts the events that characterize the loop portion of the counter-example trace. This may prevent the formal engine from finding the same counter-example twice. Verification process 10 may then go back to finding an LTL counter-example to the deadlock check until either no counter example is found (e.g., the property proves) or the loop escape cover is unreachable (e.g., a real deadlock is found). Verification process 10 may then report the escape mechanisms to the user for review (e.g., if there are soft resets, manual overrides, etc. present)

One example showing a process for checking for escapes is provided below. Given the liveness assertion (e.g., assert -name liveness {req|→s_eventually gnt}), verification process 10 may create the cover trace (e.g., cover -name escape_test {gnt}) and prove the cover from the counterexample to the assertion (e.g., % prove -property escape_test -from liveness). If the cover is reachable, then the loop in the counterexample can be 'escaped' and the counterexample doesn't represent a 'true' deadlock. Verification process 10 may then add a "waiver" constraint and re-prove the liveness assertion.

Embodiments of the verification process 10 described herein do not require any fairness constraints and any waiver constraints may be extracted automatically. Verification process 10 may effectively implement CTL "AG EF" proofs where any counterexamples are "true" deadlocks. Embodiments included herein may scale better than BDD-based CTL and may be configured to run with any engine. Verification process 10 may produce intermediate results with escapable counterexamples.

In some embodiments, verification process 10 may report escape mechanisms to the user. In one particular embodiment, the escape mechanisms may be displayed as an intersection tree. For example, starting with characterized escape mechanisms:

```
Escape Mechanism 1: ($past(x,1)==1 && $past(a,1)==1 && $past(w,1)==1 && $past(q,1)==1)
Escape Mechanism 2: ($past(x,1)==1 && $past(a,1)==1 && $past(z,1)==1 && $past(o,1)==1)
Escape Mechanism 3: ($past(x,1)==1 && $past(b,1)==1 && $past(c,1)==1)
Escape Mechanism 4: ($past(a,1)==1 && $past(b,1)==1 && $past(c,1)==1)
```

Verification process 10 may report to the user in tree form, with most common shared elements at the top:

```
% tree_print
|
+-> $past(x,1)==1          ← shared by many escape mechanisms
  (all branches under this root)
| +-> $past(a,1)==1
| | +-> $past(w,1)==1
| | | +-> $past(q,1)==1    ← specific to a single escape
  mechanism (no child branches)
| | +-> $past(z,1)==1
| |   +-> $past(o,1)==1
| +-> $past(b,1)==1 && $past(c,1)==1
+-> $past(a,1)==1 && $past(b,1)==1 && $past(c,1)==1
```

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method comprising:
receiving, using a processor, an electronic circuit design;
performing a deadlock check on the electronic circuit design using a linear temporal logic property and a proof engine;
analyzing a counterexample associated with the electronic circuit design for a loop escape condition, wherein analyzing includes proving a cover trace of a liveness obligation;
if the loop escape condition is reachable from the counterexample, extracting one or more circuit events associated with the loop escape condition;
storing information associated with the one or more circuit events;
based at least in part on the stored information, creating a waiver constraint for forcing a no deadlock outcome; and
adding the waiver constraint to the deadlock check to force the no deadlock outcome without adding a fairness constraint.

2. The computer-implemented method of claim 1, wherein extracting the one or more circuit events includes extracting one or more circuit events that enable the loop escape from the cover trace.

3. The computer-implemented method of claim 1, wherein extracting the one or more circuit events includes extracting one or more circuit events that characterizes a loop portion of the cover trace.

4. The computer-implemented method of claim 3, further comprising:
based upon, at least in part, the one or more circuit events that characterizes the loop portion of the cover trace, adding a waiver bit.

5. The computer-implemented method of claim 4, further comprising:
preventing a subsequent analysis of the counterexample.

6. The computer-implemented method of claim 1, further comprising:
iteratively repeating the performing, analyzing, extracting, and adding until either no counter example is found or the loop escape is unreachable.

7. The computer-implemented method of claim 1, further comprising:
based upon, at least in part, the loop escape condition being reachable from the counterexample, displaying, at a graphical user interface, one or more escape mechanisms for user review.

8. A computer-readable storage medium for use in an electronic design, the computer-readable storage medium having stored thereon instructions that when executed by a machine result in one or more operations, the operations comprising:
receiving, using a processor, an electronic circuit design;
performing a deadlock check on the electronic circuit design using a property and a proof engine;
analyzing a counterexample associated with the electronic circuit design for a loop escape condition, wherein analyzing includes proving a cover trace of a liveness obligation;
if the loop escape condition is reachable from the counterexample, extracting one or more circuit events associated with the loop escape condition, wherein extracting the one or more circuit events includes extracting one or more circuit events that enable the loop escape from the cover trace and extracting one or more circuit events that characterizes a loop portion of the cover trace;
based at least in part on the one or more circuit events, adding a waiver constraint to the deadlock check to force a no deadlock outcome without adding a fairness constraint to resolve an invalid loop;
adding a constraint that forces the waiver constraint to be asserted; and
iteratively repeating the performing, analyzing, extracting, adding a waiver constraint, and adding a constraint that forces the waiver constraint to be asserted until either no counter example is found or the loop escape is unreachable.

9. The computer-readable storage medium of claim 8, wherein the waiver constraint based at least in part on the one or more circuit events is added to the deadlock check automatically by the processor.

10. The computer-readable storage medium of claim 8, wherein adding a waiver constraint includes, based upon, at least in part, the one or more circuit events that characterizes the loop portion of the cover trace, adding a waiver bit to the deadlock check to force a no deadlock outcome on a given clock cycle and processing, via a logic operation, the waiver bit with the liveness obligation.

11. The computer-readable storage medium of claim 8, further comprising:
based upon, at least in part, the loop escape condition being reachable from the counterexample, displaying, at a graphical user interface, one or more escape mechanisms for user review if a soft reset, manual override, or other unintended stimulus is present.

12. The computer-readable storage medium of claim 8, wherein the deadlock check determines whether a valid input sequence exists to move beyond a current design state.

13. A system comprising:
a computing device having at least one processor configured to receive an electronic circuit design and to perform a deadlock check on the electronic circuit design using a proof engine, the at least one processor further configured to analyze a counterexample associated with the electronic circuit design for a loop escape condition, wherein analyzing includes proving a cover trace, if the loop escape condition is reachable from the counterexample, the at least one processor further configured to extract one or more circuit events associated with the loop escape and to, based at least in part on the one or more circuit events, add a waiver constraint to the deadlock check to force a no deadlock outcome without adding a fairness constraint.

14. The system of claim 13, wherein extracting the one or more circuit events includes extracting one or more circuit events that enable the loop escape from the cover trace.

15. The system of claim 13, wherein extracting the one or more circuit events includes extracting one or more circuit events that characterizes a loop portion of the cover trace.

16. The system of claim 15, wherein the at least one processor is configured to:
add a waiver bit; and
process, via an OR operation, the waiver bit with a liveness obligation corresponding to the cover trace.

17. The system of claim 16, wherein the at least one processor is configured to prevent a subsequent analysis of the counterexample.

18. The system of claim 13, further comprising:
iteratively repeating the performing, analyzing, extracting, and adding until either no counter example is found or the loop escape is unreachable.

19. The system of claim 13, further comprising:
based upon, at least in part, the loop escape condition being reachable from the counterexample, displaying, at a graphical user interface, one or more escape mechanisms for user review.

20. The system of claim 13, wherein the proof engine is a linear temporal logic proof engine.

* * * * *